US012689187B2

(12) United States Patent
Zhong et al.

(10) Patent No.: US 12,689,187 B2
(45) Date of Patent: Jul. 21, 2026

(54) INTEGRATED TYPE STEP-DOWN POWER SUPPLY DEVICE AND WELLSITE POWER SUPPLY SYSTEM

(71) Applicant: YANTAI JEREH PETROLEUM EQUIPMENT & TECHNOLOGIES CO., LTD., Yantai (CN)

(72) Inventors: Jifeng Zhong, Yantai (CN); Shouzhe Li, Yantai (CN); Liang Lv, Yantai (CN); Xincheng Li, Yantai (CN); Yipeng Wu, Yantai (CN); Shuzhen Cui, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 429 days.

(21) Appl. No.: 18/317,246

(22) Filed: May 15, 2023

(65) Prior Publication Data

US 2024/0063613 A1 Feb. 22, 2024

(30) Foreign Application Priority Data

Aug. 18, 2022 (CN) .......................... 202210990866.6

(51) Int. Cl.
*H02B 1/30* (2006.01)
*E21B 43/26* (2006.01)
(Continued)

(52) U.S. Cl.
CPC ........... *H02B 1/30* (2013.01); *E21B 43/2607* (2020.05); *F04B 17/03* (2013.01); *H02B 1/52* (2013.01); *H02B 1/565* (2013.01)

(58) Field of Classification Search
CPC . H02B 1/30; H02B 1/52; H02B 1/565; H02B 1/56; H02B 7/00; H02B 5/00;
(Continued)

(56) References Cited

U.S. PATENT DOCUMENTS 10,801,311 B1 10/2020 Cui et al.
10,865,624 B1 * 12/2020 Cui ..................... E21B 41/0085
(Continued)

FOREIGN PATENT DOCUMENTS

AU 2013206463 A1 1/2015
CN 102602322 A 7/2012
(Continued)

OTHER PUBLICATIONS

Non-Final Office Action for U.S. Appl. No. 18/905,719 mailed on Jun. 25, 2025.
(Continued)

*Primary Examiner* — John W Poos
(74) *Attorney, Agent, or Firm* — Sheppard Mullin Richter & Hampton LLP

(57) ABSTRACT

A step-down power supply device includes: a first switch cabinet configured for receiving an alternating current having a first voltage and controlling an on-off switching of a power supply network; a transformer configured for receiving the alternating current from the first switch cabinet, reducing the first voltage of the received alternating current to a second voltage, and outputting the second voltage; a second switch cabinet configured for receiving the second voltage from the transformer, and outputting the second voltage; and a radiator configured for dissipating heat of at least two of the first switch cabinet, the transformer and the second switch cabinet, wherein the first voltage is greater than the second voltage. The present disclosure can reduce the size of the step-down power supply device, while improving the efficiency of heat dissipation.

17 Claims, 6 Drawing Sheets

(51) Int. Cl.

| | |
|---|---|
| *F04B 17/03* | (2006.01) |
| *H02B 1/52* | (2006.01) |
| *H02B 1/56* | (2006.01) |

(58) Field of Classification Search

CPC . H02B 1/28; H02B 1/306; H02B 1/36; H02B 11/02; H02B 11/167; H02B 1/54; E21B 43/2607; F04B 17/03; H02J 3/00; H02M 1/00; H02M 3/156; H02M 5/458; H02M 5/4585; H02M 1/088; H02M 1/10; H02M 3/285; H02M 5/42; H02M 7/4807; H02M 7/53871; H02M 7/797; H02M 1/0012; H02M 1/007; H02M 3/155; H02M 3/1582; H02M 3/33507; H02M 5/00; H02K 2213/12; H02K 5/1732; H02K 5/18; H02K 5/20; H02K 5/203; H02K 5/225; H02K 7/06; H02K 7/1166; H02K 7/1807; H02K 7/183; H02K 16/02; H02K 7/1823; H02K 9/10

See application file for complete search history.

(56) References Cited

U.S. PATENT DOCUMENTS

| | | | | |
|---|---|---|---|---|
| 11,181,107 | B2 * | 11/2021 | Oehring | F04B 17/03 |
| 11,725,491 | B2 | 8/2023 | Zhong et al. | |
| 12,134,964 | B2 | 11/2024 | Zhong et al. | |
| 2003/0200761 | A1 | 10/2003 | Funahashi et al. | |
| 2007/0176394 | A1 | 8/2007 | Gehring et al. | |
| 2015/0114652 | A1 | 4/2015 | Lestz et al. | |
| 2015/0300336 | A1 | 10/2015 | Hernandez et al. | |
| 2017/0037718 | A1 | 2/2017 | Coli et al. | |
| 2017/0302135 | A1 | 10/2017 | Cory | |
| 2018/0156210 | A1 | 6/2018 | Oehring et al. | |
| 2019/0169971 | A1 * | 6/2019 | Oehring | E21B 43/2607 |
| 2019/0245348 | A1 * | 8/2019 | Hinderliter | H02J 3/46 |
| 2020/0109616 | A1 | 4/2020 | Oehring et al. | |
| 2020/0109617 | A1 | 4/2020 | Oehring et al. | |
| 2021/0095552 | A1 | 4/2021 | Oehring et al. | |

FOREIGN PATENT DOCUMENTS

| | | | |
|---|---|---|---|
| CN | 203261243 | U | 10/2013 |
| CN | 204316091 | U | 5/2015 |
| CN | 204361910 | U | 5/2015 |
| CN | 204928048 | U | 12/2015 |
| CN | 207194878 | U | 4/2018 |
| CN | 108900136 | A | 11/2018 |
| CN | 208548823 | U | 2/2019 |
| CN | 110155193 | A | 8/2019 |
| CN | 209687698 | U | 11/2019 |
| CN | 110784127 | A | 2/2020 |
| CN | 210049880 | U | 2/2020 |
| CN | 110913661 | A | 3/2020 |
| CN | 210139911 | U | 3/2020 |
| CN | 111917042 | A | 11/2020 |
| CN | 211930537 | U | 11/2020 |
| CN | 211958423 | U | 11/2020 |
| CN | 112423562 | A | 2/2021 |
| CN | 212671744 | A | 3/2021 |
| CN | 113404478 | A | 9/2021 |
| CN | 114204468 | A | 3/2022 |
| DE | 10347561 | B3 | 1/2005 |

OTHER PUBLICATIONS

First Office Action for Chinese Application No. 202210990866.6 mailed on Apr. 8, 2025.

First Search for Chinese Application No. 201910510839.2 mailed on Sep. 7, 2023.

Notice of Allowance for U.S. Appl. No. 16/834,433 mailed on Jun. 12, 2020.

Written Opinion of the International Searching Authority and International Search Report for PCT Application No. PCT/CN2019/102809 mailed on Mar. 11, 2020.

International Preliminary Report on Patentability Chapter I for PCT Application No. PCT/CN2019/102809 mailed on Dec. 23, 2021.

International Search Report for PCT Application No. PCT/CN2021/125211 mailed on Jun. 22, 2022.

Song et al., "Design of medium-voltage combined frequency converter for petroleum-driven fracturing."

Non-Final Office Action for U.S. Appl. No. 17/508,913 mailed on Aug. 16, 2022.

Non-Final Office Action for U.S. Appl. No. 18/340,243 mailed on Apr. 9, 2024.

Notice of Allowance for U.S. Appl. No. 18/340,243 mailed on Jul. 10, 2024.

Rejection Decision for Chinese Application No. 202210990866.6 mailed on Aug. 16, 2025 with English summary.

Notice of Allowance for Canadian Application No. 3173687 mailed on Aug. 27, 2025.

Notice of Allowance for U.S. Appl. No. 18/905,719 mailed on Nov. 5, 2025.

\* cited by examiner

INTEGRATED TYPE STEP-DOWN POWER SUPPLY DEVICE AND WELLSITE POWER SUPPLY SYSTEM

CROSS-REFERENCE TO RELATED APPLICATIONS

This application claims priority and benefit of Chinese patent application No. 202210990866.6 filed on Aug. 18, 2022. The content of the above-referenced application is incorporated herein by reference in its entirety.

TECHNICAL FIELD

The present disclosure relates to a step-down power supply device with high integration and a wellsite power supply system.

BACKGROUND ART

In view of global developing the oil and gas development devices towards low energy consumption, low noise, low emission, the traditional fracturing device with a diesel engine as the power producer has been replaced with the electric drive fracturing device with an electromotor as the power producer.

In the electric drive fracturing device replacing the diesel engine with the electromotor, since the plunger pump is driven with the electromotor through the transmission shaft, the electric drive fracturing device has advantages of small volume, light weight and economy, energy saving, environmental protection, and so on.

In the existing electric drive fracturing device, the power supply device is generally the power supply network or the electric generator and the like. The power supply network generally employs the power supply voltage of 10 kV, 13.8 kV, 35 kV, and the like. The conventional transformer device is generally employed in the wellsite for supplying power to the fracturing device. The transformer device, for example, reduces the voltage from 35 kV or 110 kV to 10 kV, and mainly includes: a first switch cabinet, a step-down transformer, and a plurality of sets of second switch cabinets. The first switch cabinet, the transformer, the second switch cabinets are combined into a set of small substation by the temporary wiring arrangement in the wellsite, and output, for example, power supply voltage of 10 kV in multipath for supplying power to the plurality of devices in the wellsite.

However, since the devices disposed in the wellsite are numerous, the existing electric drive fracturing device has lower integration and consumes a larger occupied area. If the wiring operation of the above substation is performed at the wellsite, the wiring workload is very heavy and needs a lot of manpower and time.

In addition, the fracturing construction generally continues for only 1-2 months in one wellsite, and then it is necessary to transfer the equipment to another place for use. Since the volume of each of the first switch cabinet, the transformer, the second switch cabinets is extremely large, it is very inconvenient to transport the above devices between the wellsites, or even sometimes, the radiator for the substation needs to be detached, in order to satisfy the requirements of road transport regulations.

Further, when employing the electric drive fracturing device with high power, the total installed power of the electric drive fracturing devices used in the whole wellsite may reach 20000 kw or more, and the power of the single electric drive fracturing device generally needs to reach 2000 kw or more. When all devices in the wellsite are driven with the electric power, the electric power in the whole wellsite generally exceeds 10 MW.

In the prior art, the operation personnel in the wellsite needs to manually switch the tap of the high voltage side in the above substation, but such manual switching has a lower operation efficiency, and has a huge potential safety risk.

SUMMARY OF THE EMBODIMENTS

Technical Problem to be Solved

So far, there is no step-down power supply device with a high integration, which can reduce the wiring workload in site, facilitate to transportation of the step-down power supply device between wellsites and improve the efficiency and safety of the switch operation of the substation.

Technical Solution

To solve the above problem, the purpose of the present disclosure is to provide a step-down power supply device with a high integration.

The first aspect of the present disclosure provides a step-down power supply device including: a first switch cabinet configured for receiving an alternating current having a first voltage and controlling on-off switching of a power supply network; a transformer configured for receiving the alternating current from the first switch cabinet, reducing the first voltage of the received alternating current to a second voltage, and outputting the second voltage; a second switch cabinet configured for receiving the second voltage from the transformer, and outputting the second voltage; and a radiator configured for dissipating heat of at least two of the first switch cabinet, the transformer and the second switch cabinet, wherein the first voltage is greater than the second voltage.

In some embodiments, the first voltage is two or more times the second voltage.

In some embodiments, the first switch cabinet, the transformer, and the second switch cabinet are integrally provided on a same platform.

In some embodiments, the radiator further includes a heat dissipating fan configured for performing a forced heat dissipation and a cooling for the radiator.

In some embodiments, the radiator is at least partly installed outside of the platform.

In some embodiments, the radiator is at least partly installed inside of the platform.

In some embodiments, the step-down power supply device further comprises: an on-load tap changer configured for regulating a load between the first switch cabinet and the second switch cabinet to keep the second voltage stable.

In some embodiments, the first switch cabinet is connected to the one or more transformers.

In some embodiments, the second switch cabinet supplies power to one or more electric apparatuses.

In some embodiments, the step-down power supply device further comprises: a control system configured for controlling switches in the first switch cabinet and the second switch cabinet and regulating gears of the switches.

In addition, the present disclosure also provides a wellsite power supply system including: the above step-down power supply device; and one or more electric drive fracturing devices connected to the step-down power supply device via a frequency converter sled.

In some embodiments, the wellsite power supply system further comprises: an auxiliary device, wherein, a voltage for driving the auxiliary device is less than a voltage for driving the electric drive fracturing device.

In some embodiments, the auxiliary device includes the radiator element and the heat dissipating fan.

In some embodiments, the frequency converter sled is integrated with one or more frequency converters, each of which is configured for driving at least one electric drive fracturing device or at least one auxiliary device.

In some embodiments, the electric drive fracturing devices are disposed outside both ends of a manifold including a high pressure manifold and a low pressure manifold, the frequency converter sled is disposed outside of the electric drive fracturing devices opposite to the manifold, and a high pressure manifold sled is disposed outside of the frequency converter sled opposite to the electric drive fracturing devices.

In addition, the present disclosure also provides a method of controlling the above step-down power supply device, and the method includes: regulating a load between the first switch cabinet and the second switch cabinet to keep the second voltage stable.

In some embodiments, the controlling method further comprises: controlling open/close and gears of a switch in the step-down power supply device, and controlling the gear of the on-load tap changer, to stabilize an output voltage of the step-down power supply device.

In some embodiments, the switch of the step-down power supply device is controlled in a wired or wireless manner.

In some embodiments, parameters of the step-down power supply device are read for controlling.

In some embodiments, the parameters are current, voltage, power and/or electricity consumption.

In some embodiments, when a voltage value exceeds a proportion of a rated voltage and the duration of which is longer than a predetermine value, the step-down power supply device is controlled to upshift a gear.

In some embodiments, when a voltage value is less than a proportion of a rated voltage and the duration of which is longer than a predetermine value, the step-down power supply device is controlled to downshift a gear.

In some embodiments, in a manual switching mode of the step-down power supply device, sound, light and/or image alerts are provided.

In some embodiments, in an automatic switching mode of the step-down power supply device, the control method includes automatically upshifting or downshifting according to whether the current voltage value is greater or less than the proportion of the rated voltage, and sending an alert to the electric drive fracturing device when a failure occurs.

ILLUSTRATION OF THE DRAWINGS

The drawings constituting a part of the present application are used for providing a further comprehension understanding of the present disclosure, and schematic embodiments of the present disclosure and the description thereof are used for explaining the present disclosure, but not become an adverse limitation to the present disclosure. In the drawings.

SPECIFIC EMBODIMENTS

Below, the technical solution in the embodiment of the present application will be clearly and completely described in the combination with the drawings in the embodiment of the present application, and obviously, the described embodiments are only parts of embodiments of the present application, rather than all embodiments. Based on the embodiment in the present application, all other embodiments, obtained by persons skilled in the art without inventive efforts, belong to the scope of the present application.

Figure 1:
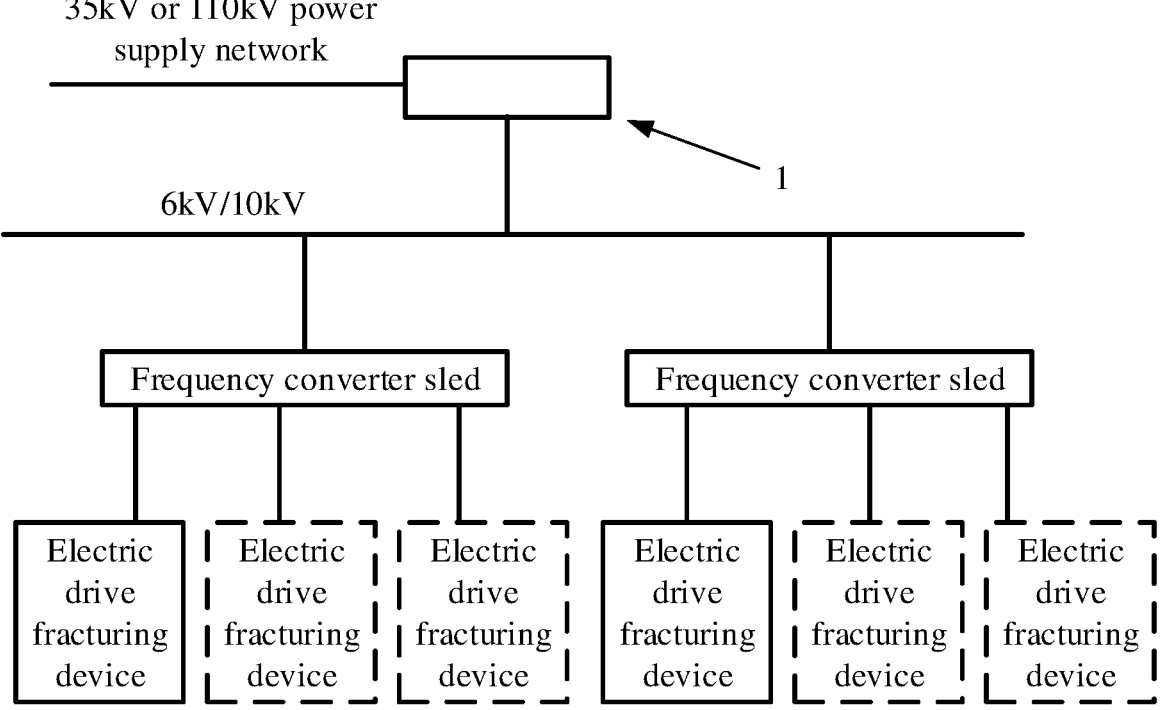
FIG. 1 shows a wellsite layout including a step-down power supply device.

Note that, the description is given in the following order.
<1. A step-down power supply device>
1.1 An outline of the layout of the step-down power supply device in the wellsite
1.2 A first structure of the step-down power supply device
1.3 A second structure of the step-down power supply device
1.4 A third structure of the step-down power supply device
<2. A wellsite power supply system>
2.1 A first configuration of the wellsite power supply system
2.2 A second configuration of the wellsite power supply system
2.3 A method of controlling the step-down power supply device
<1. A Step-Down Power Supply Device>
1.1 An Outline of the Layout of the Step-Down Power Supply Device in the Wellsite First, FIG. 1 shows a wellsite layout including a step-down power supply device 1. As shown in FIG. 1, the step-down power supply device 1 receives the alternating current from the power supply network having a first voltage (e.g., 35 kV or 110 kV), converts the high voltage alternating current into a second, lower voltage (e.g., 10 kV), and the low voltage is supplied to a plurality pieces of electric equipment such as electric drive fracturing devices through a plurality of frequency converter sleds.

1.2 A First Example Structure of the Step-Down Power Supply Device

Figure 2:
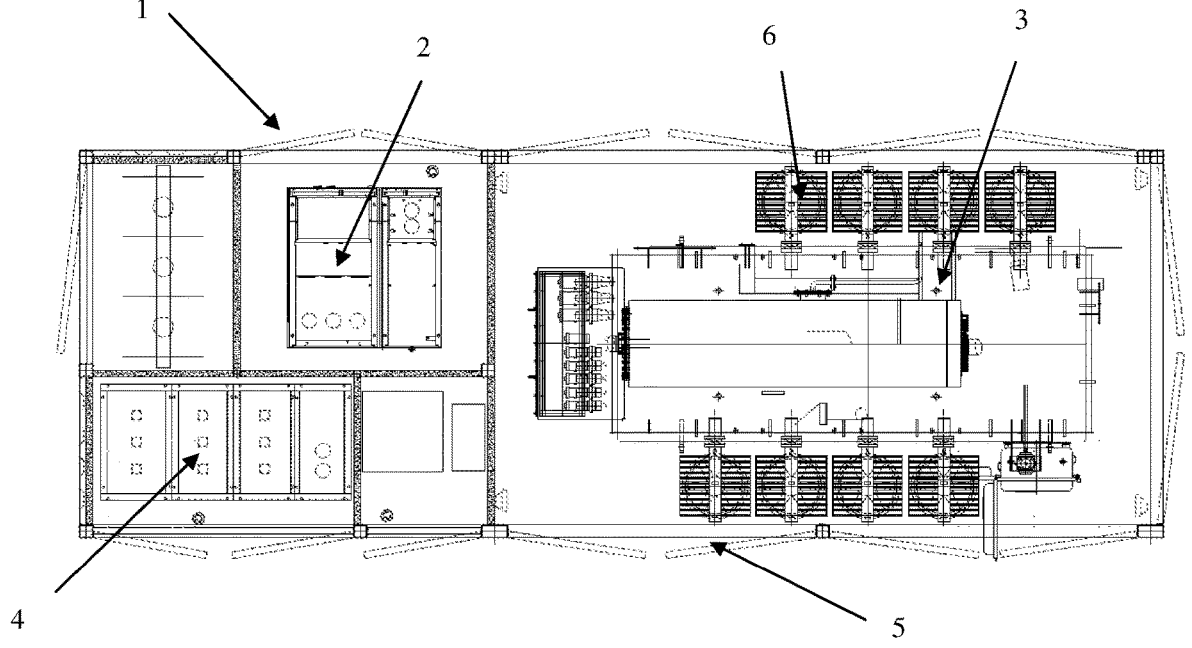
FIG. 2 shows a schematic view of a first configuration of the step-down power supply device according to the embodiment in the present disclosure.

With reference to FIG. 2, a first structure of the step-down power supply device 1 in the present disclosure is described.

FIG. 2 shows a schematic view of the first configuration of the step-down power supply device 1 according to the embodiment in the present disclosure. As shown in FIG. 2, the step-down power supply device 1 includes a first switch cabinet 2, a transformer 3, a low voltage switch cabinet 4 and a platform 5, wherein, the first switch cabinet is configured for receiving the alternating current having the first voltage and controls the on-off switching of the power supply network, and the second switch cabinet is configured for receiving the second voltage from the transformer and outputs the second voltage.

In some embodiments, for example, a 35 kV switch cabinet may be used as an example of the first switch cabinet 2, a 10 kV switch cabinet may be used as an example of the second switch cabinet 4, i.e., the first voltage is 35 kV, and the second voltage is 10 kV. It should be understood for persons skilled in the art that, the first switch cabinet 2 and the second switch cabinet 4 are not limited to the above examples.

In some embodiments, the first voltage is configured to be two, three or more times the second voltage, to effectively reduce the electric energy consumption by the system. For illustrative purposes, in the context, for example, 35 kV is used as the first voltage, 10 kV is used as the second voltage.

Each component in the step-down power supply device 1 has the following functions:

The alternating current from the power supply network having, e.g., 35 kV or 110 kV, enters into the first switch cabinet 2 through an incoming interface of the first switch cabinet 2. The first switch cabinet 2 is configured for controlling the on-off of the high voltage incoming line.

Next, the high voltage alternating current output from the first switch cabinet 2 enters into the transformer 3. The transformer 3 reduces voltage of the high voltage alternating current to, e.g., 10 kV, and transfers the reduced voltage to the second switch cabinet 4.

The second switch cabinet 4 is configured for outputting the reduced voltage, so as to supply power to the plurality of electric equipment disposed in the wellsite via the frequency converter sleds.

In addition, it should be concerned that, the first switch cabinet 2 can also have an output end for supplying power to electric equipment, which needs to be driven by high voltage, e.g., 35 kV.

As shown in FIG. 2, the step-down power supply device 1 further includes a radiator 6 for dissipating heat for the step-down power supply device 1. In some embodiments, the radiator 6 may collectively dissipate heat for at least two of the first switch cabinet 2, the transformer 3 and the second switch cabinet 4.

Since the radiator 6 in the present disclosure collectively dissipates heat for at least a portion of components in the step-down power supply device 1, to the design can reduce the whole volume of the step-down power supply device and improve the efficiency of heat dissipation.

In addition, the first switch cabinet 2, the transformer 3, the second switch cabinet 4 and the radiator 6 are accommodated on the same platform 5. The platform is, for example, a cabinet or a sled body.

As shown in FIG. 2, the step-down power supply device 1 integrally provides the first switch cabinet 2, the transformer 3, the second switch cabinet 4 and the radiator 6 on the platform 5.

Due to the configuration with integral, compact arrangement, compared with the structure of separately providing the high voltage switch, the transformer and the low voltage switch in the prior art, the step-down power supply device 1 of the present disclosure can occupy a smaller area. Furthermore, since the first switch cabinet 2, the transformer 3 and the second switch cabinet 4 have been connected to each other on the platform 5, there is no need to re-wire between the first switch cabinet 2, the transformer 3 and the second switch cabinet 4 after being transported to the wellsite, so as to extremely reduce the workload of wiring, while reducing the number of the site operation personnel.

In addition, the integral configuration of the step-down power supply device 1 facilitates transportation of the step-down power supply device 1 between respective wellsites.

Although the structure of FIG. 2 shows that the radiator 6 is installed inside the platform 5, the present disclosure is not limited to this, and the radiator 6 may be also at least partly installed outside the platform 5 or at least partly installed inside the platform 5.

Although not shown, the step-down power supply device 1 may further include auxiliary systems such as a station type transformer, a control system and so on. The station type transformer is connected to the output end of the transformer 3 and further reduces the voltage from transformer 3, so as to supply power to components of the radiator, the control system and the like. The control system may be provided on the step-down power supply device 1, or may be remotely provided, for controlling the open/close of the switches in the first switch cabinet 2 and the second switch cabinet 4, and adjusting the rise/fall of the switch gear, wherein the switch gear is configured to adjust the output voltage or output power.

1.3 A Second Example Structure of the Step-Down Power Supply Device

Figure 3:
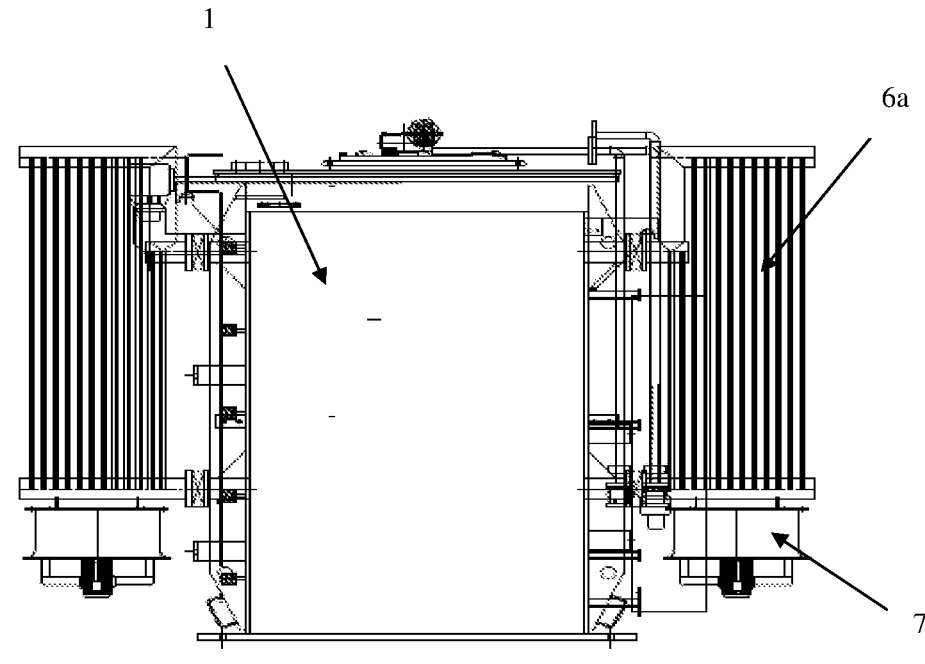
FIG. 3 shows a schematic view of a second structure of the step-down power supply device in the present disclosure.

FIG. 3 shows a schematic view of the second structure of the step-down power supply device 1 in the present disclosure. When the second structure is described, reference numerals same as those of the first structure in FIG. 1 are used with respect to same/similar components, and thus the description same as that of the first structure is omitted.

The second structure of the step-down power supply device 1 in FIG. 3 differs from the first structure in FIG. 2 in that, the radiator in the second structure further includes a heat dissipating fan 7.

Since the first switch cabinet 2, the transformer 3 and the second switch cabinet 4 in the step-down power supply device 1 produce a great deal of heat during operation, the system needs a the heat dissipation mechanism. The conventional radiator in the prior art has a larger volume, and since the method of the air cooling is employed, when the conventional radiator is applied to the step-down power supply device 1, the step-down power supply device 1 may break down due to the low efficiency of heat dissipation.

To solve the above problem, a heat dissipating fan 7 is further installed on one side of the radiator element 6a. The radiator element 6a and the heat dissipating fan 7 constitute the radiator 6 as shown in FIG. 2. The radiator element 6a is caused to dissipate heat and cooled through the heat dissipating fan 7, to improve the ventilation quantity of the radiator element 6a and prevent the step-down power supply device 1 from out of work due to overheating.

Further, since the radiator including the radiator element 6a and the heat dissipating fan 7 shown in FIG. 3 dissipates heat with respect to the integrated type step-down power supply device 1, not only the whole volume of the radiator and the step-down power supply device 1 is reduced, but also the efficiency of heat dissipation of the radiator is improved.

Although the radiator 6a and the heat dissipating fan 7 shown in FIG. 3 of the present disclosure are installed outside the step-down power supply device 1, but the installation configuration is not limited that shown in FIG. 3. The radiator 6a and the heat dissipating fan 7 may be at least partially installed inside the platform 5 of the step-down power supply device 1, or the radiator 6a and the heat dissipating fan 7 may be at least partially installed outside the platform 5 of the step-down power supply device 1.

1.4 A Third Example Structure of the Step-Down Power Supply Device

Figure 4:
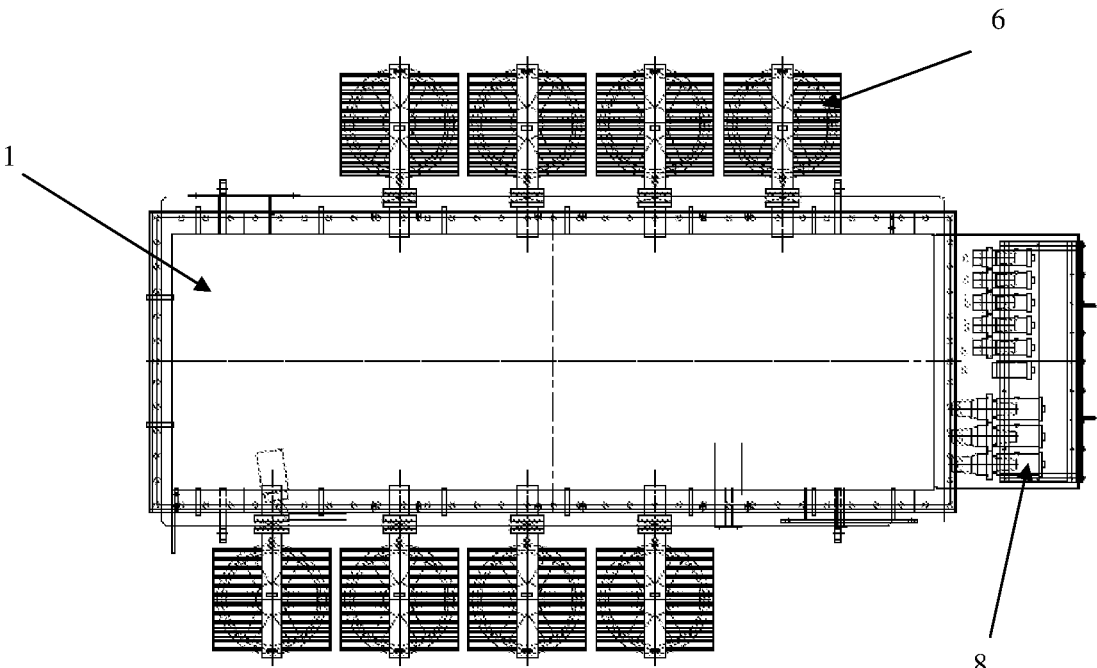
FIG. 4 shows a schematic view of a third structure of the step-down power supply device in the present disclosure.

FIG. 4 shows a schematic view of the third example structure of the step-down power supply device 1 in the present disclosure. When the third structure is described, reference numerals same as those of the first structure in FIG. 1 are used with respect to the same components, and thus the description same as that of the first structure is omitted.

The third structure of the step-down power supply device 1 in FIG. 4 differs from the first structure in FIG. 2 in that, the step-down power supply device 1 in FIG. 4 further includes an on-load tap changer 8 outside the platform 5.

Figure 5:
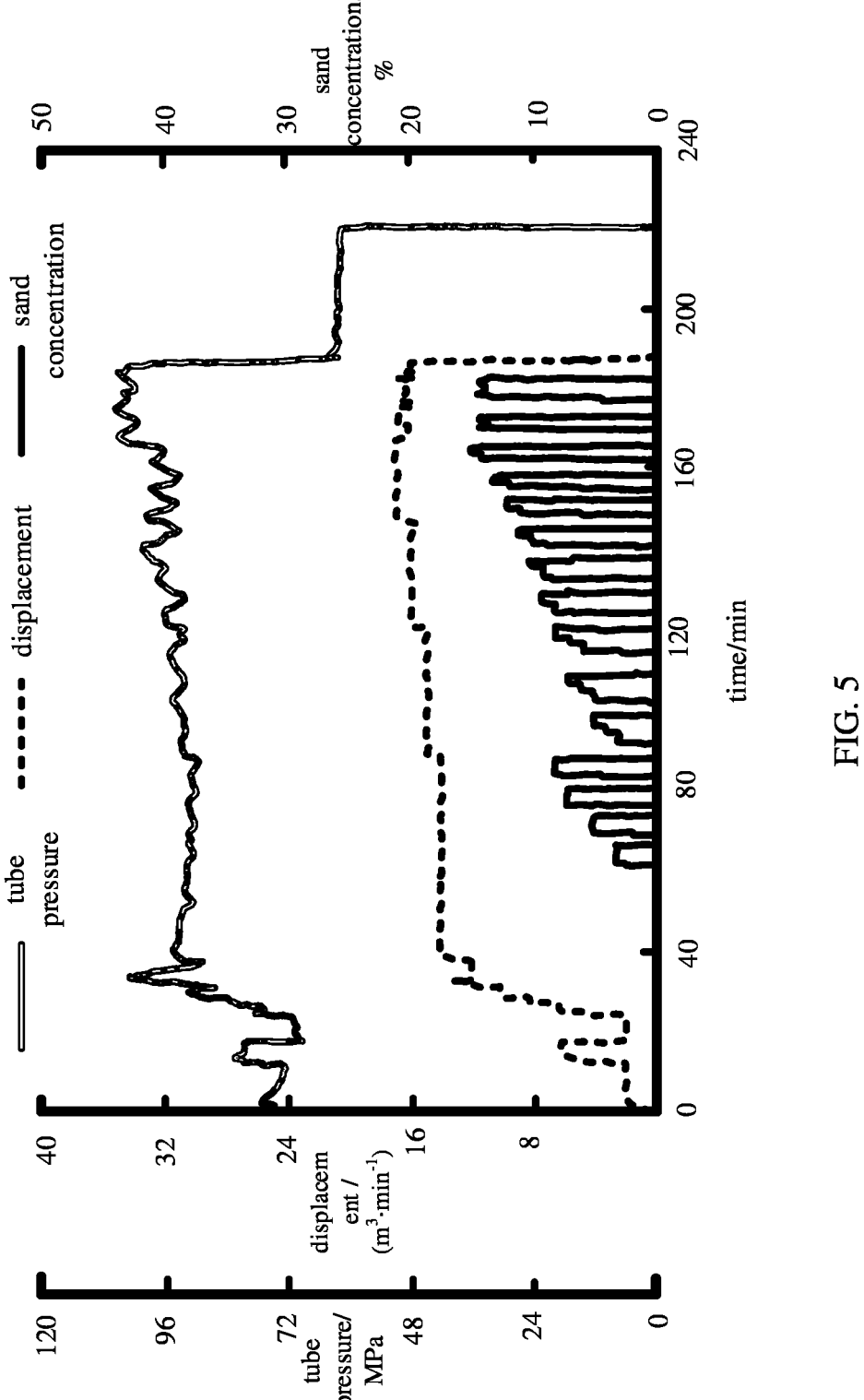
FIG. 5 shows a change curve of a tube pressure and fracturing displacement during the wellsite fracturing operation.

The wellsite fracturing operation belongs to the temporary and large power consumption. As shown in the curve in FIG. 5, when the wellsite fracturing operation is started, the tube pressure and the fracturing flow rate (the displacement shown in FIG. 5) would increase rapidly. When the operation is ended, the fracturing flow would be decreased to zero from the construction displacement. Further, during the fracturing operation, the tube pressure and the fracturing flow rate also vary according to the construction technology or the stratigraphic fluctuation, leading to a change of the electric power in the wellsite, wherein the power (kW) of the fracturing device≈the discharge pressure of the fracturing pump (approximately the tubing pressure in FIG. 5)×the fracturing flow×16.7.

For this, at the beginning of the regular fracturing operation and/or the end of the operation, due to the rapid change of the tube pressure and the fracturing flow rate, it could lead to the rapid change of the power of the fracturing device. In this case, it is necessary to keep the output voltage of the step-down power supply device 1 stable.

As to the above problem, the step-down power supply device 1 in the present disclosure is provided with the on-load tap changer 8. As an example, the on-load tap changer 8 may have three gears: a positive gear, a neutral gear and a negative gear. However, the on-load tap changer 8 of the present disclosure is not limited to this, and may also have more or less than those three gears.

The principle of regulating voltage of the on-load tap changer 8 is as follows: the first switch cabinet 2 (the high voltage side) receives the system voltage from the power supply network, and this system voltage is generally constant. When the turns number of winding at the high voltage side (the first switch cabinet 2) is increased, the voltage output from the output end of the first switch cabinet 2 or the output end of the second switch cabinet 4 is decreased. When the turns number of winding in the high voltage side (the first switch cabinet 2) is decreased, the voltage output from the output end of the first switch cabinet 2 or the output end of the second switch cabinet 4 is increased.

That is, when the turns number of winding in the first switch cabinet 2 is increased, the voltage supplied to electric components is decreased. When the turns number of winding in the first switch cabinet 2 is decreased, the voltage supplied to electric components is increased.

When the voltage output from the output end of the first switch cabinet 2 or the output end of the second switch cabinet 4 is increased, the current output from the output end of this first switch cabinet 2 or the output end of this second switch cabinet 4 is simultaneously increased, and the consumption of the circuit is increased. Since the first switch cabinet 2 or the second switch cabinet 4 is connected to electric equipment in series, in the case that the consumption of the voltage at the first switch cabinet 2 or the second switch cabinet 4 is increased, the voltage supplied to electric equipment is decreased.

To keep the voltage supplied to electric components stable, in some embodiments, when the electric power in the wellsite is large, the on-load tap changer 8 is provided.

The on-load tap changer 8 may access loads with different resistances. During the travel of the voltage from the first switch cabinet 2 to the transformer 3 to the second switch cabinet 4, the voltage division is produced in the on-load tap changer 8 due to different resistances of the loads, and varies along with the change of the resistances of electric equipment.

Based on the above operation and principle, the on-load tap changer 8 regulates the output voltage of the low voltage side by adjusting the turns number of winding of the high voltage side, so as to obtain the following effects: keeping the voltage supplied to electric components stable, so as to improve the power supply quality; and the on-load tap changer 8 acting as the transformer between the first switch cabinet 2 and the second switch cabinet 4, connected to the transformer 3 in series for dividing voltage, so as to distribute and regulate the loads between the first switch cabinet 2 and the second switch cabinet 4 by utilizing its resistances.

Since the on-load tap changer 8 may regulate the current and power, different production requirements can be satisfied, so as to improve production efficiency.

<2. A Wellsite Power Supply System>

2.1 A First Example Configuration of the Wellsite Power Supply System

Figure 6:
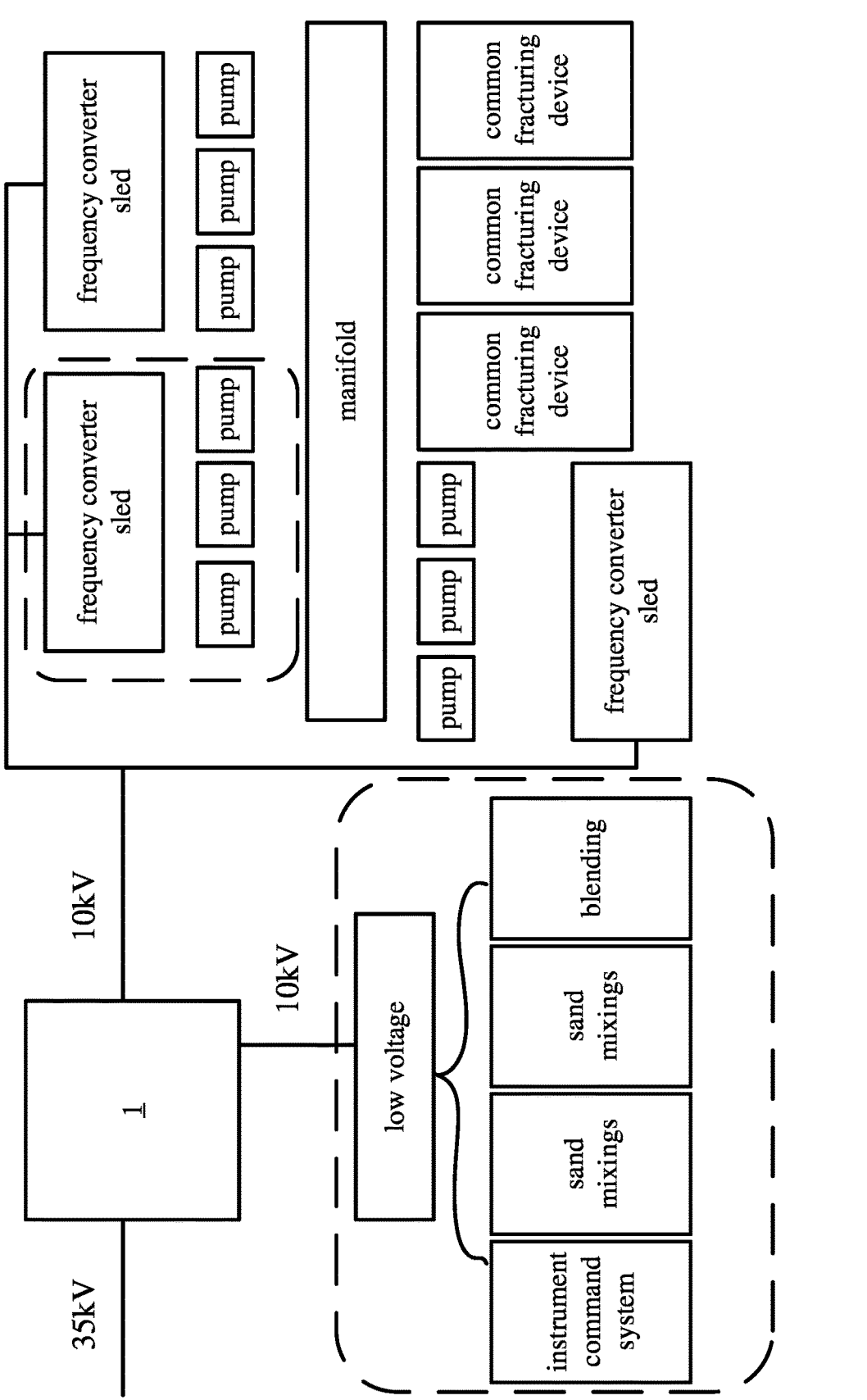
FIG. 6 shows a first layout of a wellsite power supply system including a step-down power supply device.

Next, the wellsite power supply system including the step-down power supply device 1 is described with reference to FIG. 6. FIG. 6 shows a first layout of the wellsite power supply system.

In the wellsite power supply system, the step-down power supply device 1 receives the 35 kV voltage from the power supply network, and reduces the 35 kV voltage so as to output the low voltage current of 10 kV in multipaths for supplying power to other devices in the wellsite.

In the wellsite power supply system shown in FIG. 6, the output end of the step-down power supply device 1 is connected to three frequency converter sleds and one low voltage distribution sled, and each of frequency converter sleds is integrated with three frequency converters, such that it is possible to simultaneously drive three electric drive fracturing devices, wherein each electric drive fracturing device includes a motor and a pump driven by the motor. The "pump" in FIG. 6 may represent the pump included in the electric drive fracturing device.

However, the present disclosure is not limited to this. Each frequency converter sleds may be integrated with one or two, or three or more frequency converters, each of which is configured for driving one electric drive fracturing device, so that each frequency converter sled may drive one electric drive fracturing device, simultaneously drive two electric drive fracturing devices, or simultaneously drive three or more electric drive fracturing devices.

Further, the low voltage distribution sled further reduces the voltage from the step-down power supply device 1, for example, for supplying power to the instrument command system, the plurality of sand mixings and the blending as shown in FIG. 6.

The first configuration of this wellsite power supply system uses the step-down power supply device 1 as shown in FIG. 2. Compared with a device in which the high voltage switch, the transformer and the low voltage switch are separated provided, since the step-down power supply device 1 in the present disclosure employs the integral configuration, it is possible to remarkably reduce the number of the control wiring connected with the instrument command device and the power wiring connected with the electric equipment, make the power supply connection of the whole wellsite simpler, and reduce the task of wiring.

In addition, the step-down power supply device 1 as shown in FIG. 3 may also be used in the first configuration of the wellsite power supply system, which may not only obtain the technical effects of reducing the number of the control wiring and the power wiring, but also perform the forced heat dissipation for the components of the step-down power supply device 1, improve the efficiency of heat dissipation, and reduce the size of the radiator.

The step-down power supply device 1 as shown in FIG. 4 may also be used in the first configuration of the wellsite power supply system, which may not only obtain the technical effects of reducing the number of the control wiring and the power wiring, but also stabilize the voltage supplied to the electric equipment, so as to improve production efficiency.

2.2 A Second Example Configuration of the Wellsite Power Supply System

Figure 7:
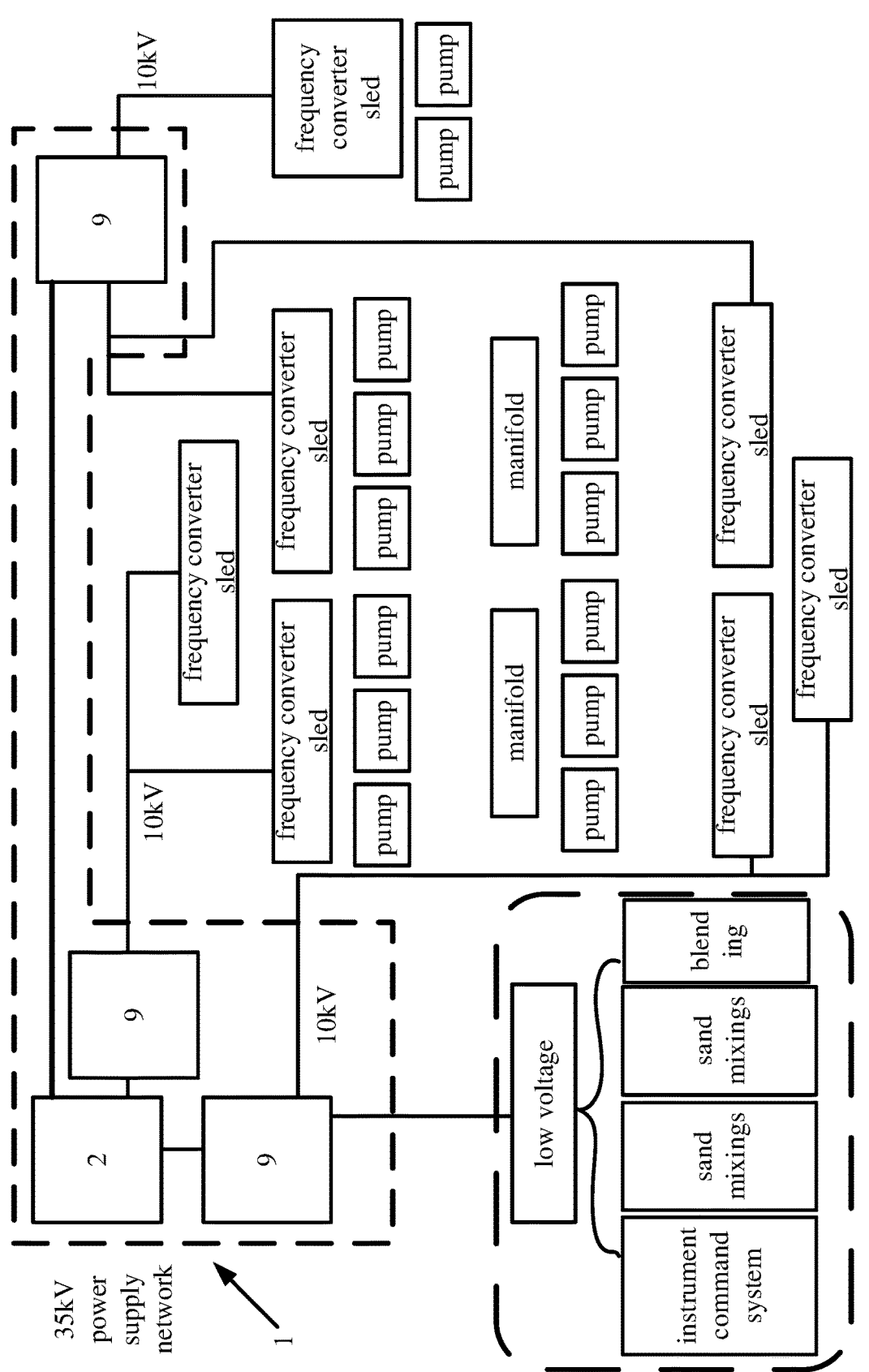
FIG. 7 shows a second layout of a wellsite power supply system including a step-down power supply device.

The wellsite power supply system including the step-down power supply device 1 is described with reference to FIG. 7. FIG. 7 shows the second layout of the wellsite power supply system.

In FIG. 7, the block scheme with the reference numeral 2 represents the first switch cabinet, the block scheme with the reference numeral 9 represents a step-down transformer device, and the step-down transformer device 9 includes the transformer 3 and the second switch cabinet 4. From this, it can be obviously seen that, compared to the first layout of the wellsite power supply system shown in FIG. 6, the second layout of the wellsite power supply system shown in FIG. 7 includes a step-down power supply device 1 different from that in the first layout. In the step-down power supply device 1, the first switch cabinet 2 is connected to a plurality of step-down transformer devices 9, so as to output 10 kV voltage in multipaths to electric equipment in the wellsite.

Further, as shown in FIG. 7, when respective device in the wellsite power supply system is situated, the manifold including a high pressure manifold and a low pressure manifold is generally provided at the middle position of the system, the electric drive fracturing devices including pumps are provided on both sides of the manifold, the frequency converter sleds equipped with the frequency converters are provided outside of the electric drive fracturing devices opposite to the manifold. In addition, although not shown, the high pressure manifold sleds are provided outside of the frequency converter sleds opposite to the electric drive fracturing devices.

In some embodiments, in the wellsite power supply system, the step-down power supply device 1 receives the 35 kV voltage from the power supply network, reduces the 35 kV voltage so as to output the low voltage current of 10 kV for supplying power to other devices in the wellsite.

In the wellsite power supply system shown in FIG. 7, the output end of the step-down transformer device 9 may be connected to two frequency converter sleds or three frequency converter sleds, or may also be connected to two frequency converter sleds and one low voltage distribution sled, wherein each frequency converter sled is integrated with three frequency converters, so as to simultaneously drive three electric drive fracturing devices. The same as the above first structure is that, each electric drive fracturing device in the second structure also includes a motor and a pump driven by the motor. The "pump" in FIG. 7 represents the pump included in the electric drive fracturing device.

However, the present disclosure is not limited to this. Each of frequency converter sleds may be integrated with one or two, or three or more frequency converters, each of which is configured for driving one electric drive fracturing device, so that each frequency converter sled may drive one electric drive fracturing device, simultaneously drive two electric drive fracturing devices, or simultaneously drive three or more electric drive fracturing devices.

Further, the low voltage distribution sled further reduces the voltage from the step-down power supply device 1, for example, for supplying power to the instrument command system, the plurality of sand mixings and the blending as shown in FIG. 7.

In the second configuration of the wellsite power supply system, similarly, the first switch cabinet 2, the transformer 3 and the second switch cabinet 4 are integrated in the platform 5, so that it is possible to remarkably reduce the number of the control wiring connected with the instrument command device and the power wiring connected with the electric equipment, make the power supply connection of the whole wellsite simpler, and reduce the task of wiring.

Similar to the first configuration of the wellsite power supply system as shown in FIG. 6, the second configuration may also use the step-down power supply device 1 as shown in FIG. 3, and may also use the step-down power supply device 1 as shown in FIG. 4, so as to obtain the technical effects of improving the efficiency of heat dissipation, reducing the size of the radiator and/or reducing the number of the control wiring and the power wiring, and improving production efficiency.

2.3 A Method of Controlling the Step-Down Power Supply Device

In respect to the control for the step-down power supply device, as shown in the third structure of the step-down power supply device 1 in FIG. 4, the step-down power supply device 1 further includes an on-load tap changer 8. The on-load tap changer 8 functions as the transformer between the first switch cabinet 2 and the second switch cabinet 4, and distributes and regulates the load between the first switch cabinet 2 and the second switch cabinet 4 with its resistance, so as to keep the second voltage stable.

However, when the voltage fluctuation of the step-down power supply device 1 exceeds a threshold, the voltage regulation operation of the on-load tap changer has a hysteresis quality, and when the voltage fluctuation of the step-down power supply device 1 is frequent, the on-load tap changer is also configured to frequently perform the switch operations. The frequent switch operations may lead to the device damage and increases the maintenance workload, so the switching cannot be performed in advance or be delayed according to the current operation condition.

As to this problem, the first configuration shown in FIG. 6 and the second configuration shown in FIG. 7 further include a control device for controlling the step-down power supply device.

In the present disclosure, the control device, for example, may be an instrument command system, which is supplied with power by the low voltage distribution sled and communicates with the control system in the step-down power supply device 1 for transmitting the control command, so as to control the step-down power supply device 1. The low voltage distribution sled receives the low voltage of 10 kV from the step-down power supply device 1 and further reduces the low voltage.

The instrument command system may control the open/close and gear of the switch in the step-down power supply device 1 in the wired or wireless manner and control the gear of the on-load tap changer 8, so as to ensure the stability of the output voltage of the step-down power supply device 1. Furthermore, the instrument command system further reads parameters, such as current, voltage, power and/or electricity consumption and the like, of the step-down power supply device 1 to perform the control.

The instrument command system may control the step-down power supply device according to the load condition of electric equipment, specifically, controlling the step-down power supply device to perform the gear switching operation, wherein the manual switch operation may be performed in the instrument command system by the operation personnel, or may be automatically performed by the control system in the instrument command system.

For this, an automotive control logic of the instrument command system is provided as an illustrative description: the automotive control logic in the instrument command system may be based on the following parameters: the rated voltage, the voltage duration, the current voltage value received by the electric equipment and the overpressure proportion.

When the present voltage value exceeds or be less than a certain proportion of the rated voltage (e.g., the overpressure proportion), and the voltage lasts for a duration longer than the predetermine value, the instrument command system indicates requirement of the upshifting or downshifting.

In the manual switching mode, the instrument command system provide alerts such as sound, light, and/or image, which includes the suggestion of upshifting or downshifting to the operation personnel. This can prevent the abnormal voltage of the step-down power supply device 1 caused by the negligence of the operation personnel, so as to avoid the shutdown of electric equipment or the damages to the electrical components in electric equipment due to the voltage less or greater than the rated voltage.

In the automatic switching mode, the instrument command system automatically performs the upshifting or downshifting according to the overpressure proportion, and sends an alert to the electric drive fracturing device when a failure occurs. According to the alert, the fracturing operating system would automatically restrict the displacement lifting of the electric drive fracturing device, and thus restricts the increase of the electric power for driving the electric drive fracturing device, so as to prevent the shutdown of electric equipment or the damages to the electrical components in electric equipment due to the voltage less or greater than the rated voltage.

However, the present disclosure is not limited to this. When the instrument command system gives the stopping pump command or starting pump command, the instrument command system may determine according to parameters of the current pressure of the electric drive fracturing device, the flow rate changing condition of the electric drive fracturing device, the current power of the electric equipment, the circuit voltage, the current, the gears of the transformer 3 and the like, and change the gear of the transformer 3, so as to reduce the voltage fluctuation. For example, after the pump is started, the pressure and the flow rate of the electric drive fracturing device rapidly increase, and the instrument command system will give the upshifting command, so as to raise the gear of the transformer 3 to reduce the voltage fluctuation.

Further, although not shown, the instrument command system further includes a remotely operating system of the electric drive fracturing device, which receives the voltage value supplied to the electric equipment. When the voltage value is less than the threshold or the shift fails due to the abnormality or damage of the device, the relevant information of the abnormal gear of the step-down power supply device 1 is supplied, to provide alerts of regulating the gear of the step-down power supply device 1 or reducing the change of the pressure or flow rate of the electric drive fracturing device, so as to prevent the following cases: the power of the fracturing device greatly fluctuates since the gear of the step-down power supply device 1 is abnormal but the power is not regulated in time, leading the shutdown or the device damage.

Further, in the case that the instrument command system is supplied with power via the low voltage distribution sled, the electric power needs to pass through a plurality of power supply devices or components (e.g., the transformer, the 10 kV switch cabinet, the low voltage distribution sled and the like), there is a possibility of the problem with a less power stability.

To solve the above problem, the instrument command system in the present disclosure may be directly connected to the step-down power supply device 1. In this case, even if the device configured for supplying power to the instrument command system, such as the low voltage distribution sled, shuts off urgently, since the instrument command system still can directly obtain the electric power from the step-down power supply device 1 through the dedicated line, and since the instrument command system includes an uninterrupted power supply acting as the reserve power supply or the accumulator, it is possible to ensure the instrument command system still having the control and monitor capability in the case of the emergency power off.

The above description only is the preferable embodiments of carrying out the techniques of the present application, but the scope of the present application is not limited to this. Any modification, equivalent alternative or change for the technical solution and the inventive concept according to the present application, within the technical scope disclosed in the present application, by any persons skilled in the art familiar to the present technology should be contained in the scope of the present application.

What is claimed is:

1. A step-down power supply device comprising:
a first switch cabinet configured for receiving an alternating current having a first voltage and controlling on-off switching of a power supply network;
a transformer configured for receiving the alternating current from the first switch cabinet, reducing the first voltage of the received alternating current to a second voltage, and outputting the second voltage;
a second switch cabinet configured for receiving the second voltage from the transformer and outputting the second voltage;
a radiator configured for dissipating heat of at least two of the first switch cabinet, the transformer, and the second switch cabinet; and
an on-load tap changer configured for regulating a load between the first switch cabinet and the second switch cabinet to keep the second voltage stable,
wherein the first voltage is greater than the second voltage.

2. The step-down power supply device according to claim 1, wherein the first voltage is two or more times the second voltage.

3. The step-down power supply device according to claim 1, wherein the first switch cabinet, the transformer, and the second switch cabinet are integrally provided on a same platform.

4. The step-down power supply device according to claim 3, wherein the radiator is at least partly installed outside of the platform.

5. The step-down power supply device according to claim 3, wherein the radiator is at least partly installed inside of the platform.

6. The step-down power supply device according to claim 1, wherein the radiator further includes a heat dissipating fan configured for performing a forced heat dissipation and a cooling for the radiator.

7. The step-down power supply device according to claim 1, comprising a plurality of transformers including the transformer, wherein the first switch cabinet is connected to one or more of the transformers.

8. The step-down power supply device according to claim 7, wherein the second switch cabinet supplies power to one or more electric apparatuses.

9. The step-down power supply device according to claim 1, further comprising: a control system configured for controlling switches in the first switch cabinet and the second switch cabinet and regulating gears of the switches.

10. A method of controlling the step-down power supply device of claim 1, the method comprising:

regulating a load between the first switch cabinet and the second switch cabinet to keep the second voltage stable.

11. The method according to claim 10, further comprising:

controlling open/close and gears of a switch in the step-down power supply device and controlling a gear of the on-load tap changer, to stabilize an output voltage of the step-down power supply device.

12. The controlling method according to claim 11, wherein in a manual switching mode of the step-down power supply device, sound, light and/or image alerts are provided.

13. The controlling method according to claim 10, when a voltage value exceeds a proportion of a rated voltage and a duration of the voltage value exceeding the proportion of the rated voltage is longer than a predetermined value, controlling the step-down power supply device to upshift a gear.

14. The controlling method according to claim 13, wherein the upshifting is automatic, and the method further comprises sending an alert to an electric drive fracturing device when a failure occurs.

15. The controlling method according to claim 10, when a voltage value is less than a proportion of a rated voltage and a duration of the voltage value being less than the proportion of the rated voltage is longer than a predetermined value, controlling the step-down power supply device to downshift a gear.

16. A wellsite power supply system comprising:

a step-down power supply device;

one or more electric drive fracturing devices connected to the step-down power supply device via a frequency converter sled; and an auxiliary device, wherein the step-down power supply device comprises:

a first switch cabinet configured for receiving an alternating current having a first voltage and controlling on-off switching of a power supply network;

a transformer configured for receiving the alternating current from the first switch cabinet, reducing the first voltage of the received alternating current to a second voltage, and outputting the second voltage;

a second switch cabinet configured for receiving the second voltage from the transformer and outputting the second voltage; and a radiator configured for dissipating heat of at least two of the first switch cabinet, the transformer, and the second switch cabinet, wherein the first voltage is greater than the second voltage;

wherein a voltage for driving the auxiliary device is less than a voltage for driving the one or more electric drive fracturing devices; and wherein the frequency converter sled is integrated with one or more frequency converters, and each of the one or more frequency converters is configured for driving at least one electric drive fracturing device or at least one auxiliary device.

17. The wellsite power supply system according to claim 16, wherein the one or more electric drive fracturing devices includes a plurality of electric drive fracturing devices, the electric drive fracturing devices are disposed on both sides of a manifold that has a high pressure manifold and a low pressure manifold, the frequency converter sled is disposed outside of the electric drive fracturing devices opposite to the manifold, and a high pressure manifold sled is disposed outside of the frequency converter sled opposite to the electric drive fracturing devices.

* * * * *